US008131630B2

(12) United States Patent
Claus et al.

(10) Patent No.: US 8,131,630 B2
(45) Date of Patent: *Mar. 6, 2012

(54) TRADING ORDER ROUTING

(75) Inventors: Matthew W. Claus, Summit, NJ (US); Joseph C. Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/953,407

(22) Filed: Nov. 23, 2010

(65) Prior Publication Data

US 2011/0071937 A1 Mar. 24, 2011

Related U.S. Application Data

(63) Continuation of application No. 11/146,646, filed on Jun. 7, 2005, now Pat. No. 7,840,477.

(51) Int. Cl.
*G06Q 40/00* (2006.01)
(52) U.S. Cl. ........................................................ 705/37
(58) Field of Classification Search ....................... 705/37
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 5,077,665 A | 12/1991 | Silverman et al. |
| 5,101,353 A | 3/1992 | Lupien et al. |
| 5,136,501 A | 8/1992 | Silverman et al. |
| 5,297,031 A | 3/1994 | Gutterman et al. |
| 5,305,200 A | 4/1994 | Hartheimer et al. |
| 5,375,055 A | 12/1994 | Togher et al. |

(Continued)

FOREIGN PATENT DOCUMENTS

EP 0388162 3/1990

(Continued)

OTHER PUBLICATIONS

NASDAQ: SuperMontage Release 1.0—Functional Description, Version 2.0, 2001, pp. 1-15.*

(Continued)

*Primary Examiner* — Bijendra K Shrestha

(57) ABSTRACT

An apparatus for routing trading orders comprises a memory and a processor. The memory stores first trading information associated with a first buy order placed with a first market center. The first buy order is associated with a product and the first trading information comprises a disclosed quantity of the product and a reserved quantity of the product. The memory also stores second trading information associated with a second buy order placed with a second market center. The second buy order is associated with the product and the second trading information comprises a disclosed quantity of the product and a reserved quantity of the product. The processor is coupled to the memory and receives a sell order associated with a quantity of the product. The processor further cancels at least a portion of the second buy order placed with the second market center for placement with the first market center. The canceled portion of the second buy order is determined based at least in part upon the second trading information. The processor further routes at least one additional sell order to the first market center having a quantity that is based upon at least one of the first trading information and the canceled portion of the second buy order.

20 Claims, 2 Drawing Sheets

U.S. PATENT DOCUMENTS

| | | | |
|---|---|---|---|
| 5,717,989 | A | 2/1998 | Tozzoli et al. |
| 5,727,165 | A | 3/1998 | Ordish et al. |
| 5,787,402 | A | 7/1998 | Potter et al. |
| 5,794,207 | A | 8/1998 | Walker et al. |
| 5,873,071 | A | 2/1999 | Ferstenberg et al. |
| 5,915,245 | A | 6/1999 | Patterson, Jr. et al. |
| 5,930,762 | A | 7/1999 | Masch |
| 5,950,177 | A | 9/1999 | Lupien et al. |
| 5,970,479 | A | 10/1999 | Shepherd |
| 6,012,046 | A | 1/2000 | Lupien et al. |
| 6,014,643 | A | 1/2000 | Minton |
| 6,029,146 | A | 2/2000 | Hawkins et al. |
| 6,058,379 | A | 5/2000 | Odom et al. |
| 6,098,051 | A | 8/2000 | Lupien et al. |
| 6,141,653 | A | 10/2000 | Conklin et al. |
| 6,173,270 | B1 | 1/2001 | Cristofich et al. |
| 6,236,972 | B1 | 5/2001 | Shkedy |
| 6,247,000 | B1 | 6/2001 | Hawkins et al. |
| 6,278,982 | B1 | 8/2001 | Korhammer et al. |
| 6,285,989 | B1 | 9/2001 | Shoham |
| 6,393,409 | B2 | 5/2002 | Young et al. |
| 6,405,180 | B2 | 6/2002 | Tilfors et al. |
| 6,408,282 | B1 | 6/2002 | Buist |
| 6,418,419 | B1 | 7/2002 | Nieboer et al. |
| 6,421,653 | B1 | 7/2002 | May |
| 6,505,175 | B1 | 1/2003 | Silverman et al. |
| 6,532,460 | B1 | 3/2003 | Amanat et al. |
| 6,536,935 | B2 | 3/2003 | Parunak et al. |
| H2064 | H | 5/2003 | Buchalter |
| 6,601,044 | B1 | 7/2003 | Wallman |
| 6,606,744 | B1 | 8/2003 | Mikurak |
| 6,615,188 | B1* | 9/2003 | Breen et al. ............. 705/37 |
| 6,618,707 | B1 | 9/2003 | Gary |
| 6,625,583 | B1 | 9/2003 | Silverman et al. |
| 6,629,082 | B1 | 9/2003 | Hambrecht et al. |
| 6,731,729 | B2 | 5/2004 | Eng et al. |
| 6,772,132 | B1 | 8/2004 | Kemp, II et al. |
| 6,829,589 | B1 | 12/2004 | Saliba |
| 6,847,934 | B1 | 1/2005 | Lin et al. |
| 6,871,191 | B1 | 3/2005 | Kinney, Jr. et al. |
| 6,909,941 | B2 | 6/2005 | Scott et al. |
| 6,938,011 | B1 | 8/2005 | Kemp, II et al. |
| 6,963,856 | B2 | 11/2005 | Lutnick et al. |
| 6,983,260 | B2 | 1/2006 | Hummelgren |
| 7,035,820 | B2 | 4/2006 | Goodwin et al. |
| 7,058,602 | B1 | 6/2006 | La Mura et al. |
| 7,110,969 | B1 | 9/2006 | Bennett et al. |
| 7,110,975 | B2* | 9/2006 | Marks de Chabris et al. .. 705/37 |
| 7,113,924 | B2* | 9/2006 | Fishbain ............. 705/37 |
| 7,127,424 | B2 | 10/2006 | Kemp, II et al. |
| 7,152,037 | B2 | 12/2006 | Smith |
| 7,162,447 | B1 | 1/2007 | Cushing |
| 7,181,419 | B1 | 2/2007 | Mesaros |
| 7,197,483 | B2 | 3/2007 | Brady et al. |
| 7,213,000 | B2 | 5/2007 | Gutierrez et al. |
| 7,242,669 | B2 | 7/2007 | Bundy et al. |
| 7,246,092 | B1* | 7/2007 | Peterson et al. ............. 705/37 |
| 7,277,868 | B2 | 10/2007 | Terashima |
| 7,310,620 | B2 | 12/2007 | Moore et al. |
| 7,330,834 | B1* | 2/2008 | LaPierre ............. 705/37 |
| 7,383,220 | B1 | 6/2008 | Keith |
| 7,386,497 | B1 | 6/2008 | Gooch |
| 7,392,214 | B1 | 6/2008 | Fraser et al. |
| 7,401,044 | B1 | 7/2008 | Fraser et al. |
| 7,536,338 | B2 | 5/2009 | Guler et al. |
| 7,693,775 | B2* | 4/2010 | Korhammer et al. ........... 705/37 |
| 7,711,644 | B2 | 5/2010 | Claus et al. |
| 7,835,987 | B2 | 11/2010 | Daley et al. |
| 7,840,477 | B2 | 11/2010 | Claus et al. |
| 7,979,339 | B2 | 7/2011 | Claus et al. |
| 2001/0037284 | A1 | 11/2001 | Finkelstein et al. |
| 2001/0042040 | A1 | 11/2001 | Keith |
| 2001/0049651 | A1 | 12/2001 | Selleck |
| 2001/0051909 | A1 | 12/2001 | Keith |
| 2001/0056396 | A1 | 12/2001 | Goino |
| 2002/0010672 | A1 | 1/2002 | Waelbroeck et al. |
| 2002/0016758 | A1 | 2/2002 | Grigsby |
| 2002/0023037 | A1 | 2/2002 | White, Jr. |
| 2002/0046127 | A1 | 4/2002 | Reading et al. |
| 2002/0052822 | A1 | 5/2002 | Terashima |
| 2002/0052827 | A1 | 5/2002 | Waelbroeck et al. |
| 2002/0055901 | A1 | 5/2002 | Gianakouros et al. |
| 2002/0073016 | A1 | 6/2002 | Furbrush et al. |
| 2002/0087451 | A1 | 7/2002 | Rieger et al. |
| 2002/0091606 | A1 | 7/2002 | Shapiro |
| 2002/0099640 | A1 | 7/2002 | Lange |
| 2002/0120546 | A1 | 8/2002 | Zajac |
| 2002/0156719 | A1 | 10/2002 | Finebaum et al. |
| 2002/0169703 | A1 | 11/2002 | Lutnick et al. |
| 2002/0178104 | A1 | 11/2002 | Hausman |
| 2002/0188548 | A1 | 12/2002 | Bunda |
| 2002/0198816 | A1 | 12/2002 | Gilbert et al. |
| 2003/0004858 | A1 | 1/2003 | Schmitz et al. |
| 2003/0009411 | A1 | 1/2003 | Ram et al. |
| 2003/0009412 | A1 | 1/2003 | Furbush et al. |
| 2003/0009413 | A1 | 1/2003 | Furbush et al. |
| 2003/0014351 | A1 | 1/2003 | Neff et al. |
| 2003/0093343 | A1 | 5/2003 | Huttenlocher et al. |
| 2003/0097325 | A1 | 5/2003 | Friesen et al. |
| 2003/0101128 | A1 | 5/2003 | Abernethy |
| 2003/0101130 | A1 | 5/2003 | Cliff |
| 2003/0149636 | A1 | 8/2003 | Lutnick et al. |
| 2003/0149661 | A1 | 8/2003 | Mithcell et al. |
| 2003/0167224 | A1 | 9/2003 | Periwal |
| 2003/0172024 | A1 | 9/2003 | Kokis et al. |
| 2003/0177082 | A1 | 9/2003 | Buckwalter |
| 2003/0177085 | A1 | 9/2003 | Buckwalter et al. |
| 2003/0177086 | A1 | 9/2003 | Gomber et al. |
| 2003/0216932 | A1 | 11/2003 | Foley |
| 2003/0220867 | A1 | 11/2003 | Goodwin et al. |
| 2003/0225646 | A1 | 12/2003 | Failla et al. |
| 2003/0225674 | A1 | 12/2003 | Hughes et al. |
| 2003/0229557 | A1 | 12/2003 | Richmann et al. |
| 2003/0229569 | A1 | 12/2003 | Nalbandian et al. |
| 2003/0236729 | A1 | 12/2003 | Epstein et al. |
| 2004/0019551 | A1 | 1/2004 | Martyn et al. |
| 2004/0024684 | A1 | 2/2004 | Montepeque |
| 2004/0034591 | A1 | 2/2004 | Waelbroeck et al. |
| 2004/0059666 | A1 | 3/2004 | Waelbroeck et al. |
| 2004/0093296 | A1 | 5/2004 | Phelan et al. |
| 2004/0103054 | A1 | 5/2004 | Singer |
| 2004/0143538 | A1 | 7/2004 | Korhammer et al. |
| 2004/0177024 | A1 | 9/2004 | Bok et al. |
| 2004/0210505 | A1 | 10/2004 | Pourhamid |
| 2004/0210511 | A1 | 10/2004 | Waelbroeck et al. |
| 2004/0210512 | A1 | 10/2004 | Fraser et al. |
| 2004/0210514 | A1 | 10/2004 | Kemp et al. |
| 2004/0215538 | A1 | 10/2004 | Smith et al. |
| 2004/0236636 | A1 | 11/2004 | Lutnick et al. |
| 2004/0236662 | A1 | 11/2004 | Korhammer et al. |
| 2005/0015323 | A1 | 1/2005 | Myr |
| 2005/0017710 | A1 | 1/2005 | Steinich et al. |
| 2005/0027635 | A1* | 2/2005 | Monroe et al. ................. 705/37 |
| 2005/0044031 | A1 | 2/2005 | Lebedev |
| 2005/0055304 | A1 | 3/2005 | Lutnick et al. |
| 2005/0055305 | A1 | 3/2005 | Lutnick et al. |
| 2005/0075898 | A1 | 4/2005 | Wasserman et al. |
| 2005/0108141 | A1 | 5/2005 | Farrell et al. |
| 2005/0119966 | A1 | 6/2005 | Sandholm et al. |
| 2005/0125326 | A1 | 6/2005 | Nangalia et al. |
| 2005/0154630 | A1 | 7/2005 | Lin et al. |
| 2005/0160032 | A1 | 7/2005 | Lutnick et al. |
| 2005/0171887 | A1 | 8/2005 | Daley et al. |
| 2005/0171888 | A1 | 8/2005 | Daley et al. |
| 2005/0171889 | A1 | 8/2005 | Daley et al. |
| 2005/0171890 | A1 | 8/2005 | Daley et al. |
| 2005/0171891 | A1 | 8/2005 | Daley et al. |
| 2005/0289043 | A1 | 12/2005 | Maudlin |
| 2006/0015436 | A1* | 1/2006 | Burns et al. ..................... 705/37 |
| 2006/0015441 | A1 | 1/2006 | Burkhardt et al. |
| 2006/0026090 | A1 | 2/2006 | Balabon |
| 2006/0059079 | A1 | 3/2006 | Howorka |
| 2006/0080222 | A1 | 4/2006 | Lutnick et al. |
| 2006/0085319 | A1 | 4/2006 | Nangalia et al. |
| 2006/0136318 | A1 | 6/2006 | Rafieyan et al. |
| 2006/0149662 | A1 | 7/2006 | Nordlicht et al. |
| 2006/0190386 | A1 | 8/2006 | Levy |

| | | | |
|---|---|---|---|
| 2006/0253379 A1* | 11/2006 | Adcock et al. | 705/37 |
| 2006/0253381 A1 | 11/2006 | Adock et al. | |
| 2006/0253382 A1 | 11/2006 | Adcock et al. | |
| 2006/0259404 A1 | 11/2006 | Brumfield et al. | |
| 2006/0277137 A1 | 12/2006 | Claus et al. | |
| 2007/0005481 A1 | 1/2007 | Kedia et al. | |
| 2007/0005484 A1 | 1/2007 | Waelbroeck et al. | |
| 2007/0100734 A1 | 5/2007 | Berger et al. | |
| 2007/0118464 A1 | 5/2007 | Avery | |
| 2007/0130048 A1 | 6/2007 | Claus et al. | |
| 2007/0130050 A1 | 6/2007 | Claus et al. | |
| 2007/0156574 A1 | 7/2007 | Marynowski et al. | |
| 2007/0156754 A1 | 7/2007 | Busch et al. | |
| 2007/0174179 A1 | 7/2007 | Avery | |
| 2007/0219898 A1 | 9/2007 | Burkhardt et al. | |
| 2008/0015974 A1 | 1/2008 | Balabon | |
| 2008/0097893 A1* | 4/2008 | Walsky et al. | 705/37 |
| 2008/0319891 A1 | 12/2008 | Scheinberg et al. | |
| 2011/0071937 A1 | 3/2011 | Claus et al. | |

FOREIGN PATENT DOCUMENTS

| | | |
|---|---|---|
| EP | 1081614 A2 | 3/2001 |
| GB | 2389687 | 12/2003 |
| GB | 2411492 | 8/2005 |
| JP | WO/00/67172 | 11/2000 |
| JP | 2002-007707 | 1/2002 |
| JP | 2002-007782 | 1/2002 |
| JP | 2002-063402 | 2/2002 |
| JP | 2002-133113 | 5/2002 |
| JP | 2002-183446 | 6/2002 |
| JP | 2002-197283 | 7/2002 |
| JP | 2002-203112 | 7/2002 |
| JP | 2002-230304 | 8/2002 |
| JP | 2002-259761 | 9/2002 |
| JP | 2002-269349 | 9/2002 |
| JP | 2003-058733 | 2/2003 |
| JP | 2003-058741 | 2/2003 |
| JP | 2003-515824 | 5/2003 |
| JP | 2003/522992 | 7/2003 |
| JP | 2003-524241 | 8/2003 |
| JP | 2003-525480 | 8/2003 |
| JP | 2003-331188 | 11/2003 |
| JP | 3493193 | 11/2003 |
| JP | 2003345987 | 12/2003 |
| WO | WO 00/11587 | 3/2000 |
| WO | WO 00/26834 | 5/2000 |
| WO | WO/00/77670 | 12/2000 |
| WO | WO 01/09757 | 2/2001 |
| WO | WO 01/25996 | 4/2001 |
| WO | WO 01/48655 A1 | 7/2001 |
| WO | WO 01/52150 | 7/2001 |
| WO | WO 01/54037 | 7/2001 |
| WO | WO/01/55923 | 8/2001 |
| WO | WO 01/057612 | 8/2001 |
| WO | WO 01/75752 | 10/2001 |
| WO | WO 01/77946 | 10/2001 |
| WO | WO 01/93169 A1 | 12/2001 |
| WO | WO 02/071297 A1 | 9/2002 |
| WO | WO 02/086657 A2 | 10/2002 |
| WO | WO 03/001325 | 1/2003 |
| WO | WO 2004/008296 | 1/2004 |
| WO | WO 2004/068272 | 8/2004 |
| WO | WO 2005/083603 | 9/2005 |

OTHER PUBLICATIONS

Hendershott, T.: Electronic Trading in Financial Market, Jul./Aug. 2003, IT PRO, IEEE Computer Society, pp. 1-5.*
Notification of Transmittal of International Search Report and Written Opinion for PCT Application No. PCT/US06/30636; Apr. 30, 2007; 8 pages.
USPTO Office Action for U.S. Appl. No. 11/499,496, dated May 1, 2008 (12 pages).
USPTO Office Action for U.S. Appl. No. 10/767,546, Oct. 29, 2008 (35 pages).
USPTO Office Action for U.S. Appl. No. 10/767,588, Oct. 23, 2008 (8 pages).
Patent Pending U.S. Appl. No. 10/767,546 entitled System and Methods for Routing a Trading Order.
Patent Pending U.S. Appl. No. 10/767,588 entitled System and Methods for Routing a Trading Order According to Price.
Patent Pending U.S. Appl. No. 10/767,699 entitled System and Methods for Controlling the Disclosure of a Trading Order.
Patent Pending U.S. Appl. No. 10/766,965 entitled System and Methods for Avoiding Transaction Costs Associated with Trading Order.
Patent Pending U.S. Appl. No. 10/767,649 entitled System and Methods for Routing a Trading Order.
USPTO Office Action for U.S. Appl. No. 10/767,699, Oct. 26, 2007 (22 pages).
USPTO Office Action for U.S. Appl. No. 10/767,649, Mar. 3, 2008 (24 pages).
USPTO Office Action for U.S. Appl. No. 10/767,546, Feb. 4, 2008, (48 pages).
USPTO Office Action for U.S. Appl. No. 10/766,965, Feb. 7, 2008 (49 pqages).
USPTO Office Action for U.S. Appl. No. 10/767,588, Jan. 11, 2008 (19 pages).
European Patent Office Examination Report for Application No. 05712564.3-1238; Nov. 14, 2007 (5 pages).
European Patent Office Examination Report for Application No. 05712566.8-1238; Nov. 14, 2007 (5 pages).
Notification of Transmittal of International Search Report and Written Opinion for PCT Application No. PCT/US06/30638; Apr. 20, 2007 (8 pages).
Vergote, et. al. How to match Trades and Quotes for NYSE Stocks, Mar. 2005 (21 pages).
Notification of Transmittal of International Search Report and Written Opinion for PCT Application No. PCT/US05/03166; Nov. 4, 2005 (7 pages).
Notification of Transmittal of International Search Report and Written Opinion for PCT Application No. PCT/US05/03159; Feb. 24, 2006, (11 pages).
Notification of Transmittal of International Search Report and Written Opinion for PCT Application No. PCT/US05/03164; Dec. 13, 2006 (6 pages).
Notification of Transmittal of International Search Report and Written Opinion for PCT Application No. PCT/US05/03163; Jan. 4, 2007 (9 pages).
Notification of Transmittal of International Search Report and Written Opinion for PCT Application No. PCT/US05/03168; Jan. 29, 2007 (6 pages).
Supplementary European Search Report for International Application No. PCT/US05/03166; Jan. 8, 2007 (3 pages).
Parlour, Christine, Price Dynamics in Limit Order Markets, Queens University, Kingston Ontario Canada, Nov. 1, 1995 (111 pages).
Weber, Bruce; Screen-Based Trading in Futures Markets: Recent Developments and Research Propositions, Abstract, ISBN 076950013, Jun. 21, 2005 (1 page).
Balance of Trade, Banking Technology, vol. 20, No. 9 ISSN 0266-0865, Nov. 1, 2004; pp. 42-44.
USPTO Office Action for U.S. Appl. No. 10/767,699, Jul. 22, 2008 (13 pages).
Supplementary European Search Report for Application No. 05712562.7; Jul. 28, 2008 (2 pages).
Supplementary European Search Report for Application No. 05712563.5; Jul. 28, 2008 (2 pages).
USPTO Office Action for U.S. Appl. No. 11/499,496, dated Apr. 27, 2009 (3 pages).
USPTO Office Action for U.S. Appl. No. 11/499,496, dated Jan. 26, 2009 (16 pages).
USPTO Office Action for U.S. Appl. No. 11/499,833, dated May 19, 2008 (12 pages).
USPTO Office Action for U.S. Appl. No. 11/499,833, dated Nov. 14, 2008 (14 pages).
USPTO Office Action for U.S. Appl. No. 11/499,833, dated Aug. 18, 2009 (15 pages).
USPTO Office Action for U.S. Appl. No. 10/766,965, Nov. 21, 2008 (20 pages).
Australian Examiner's Report for AU Application No. 2006278384 dated, Aug. 5, 2009 (3 pages).
USPTO Office Action for U.S. Appl. No. 10/767,546, Oct. 7, 2009 (19 pages).

USPTO Office Action for U.S. Appl. No. 10/767,588, Oct. 27, 2009 (6 pages).
USPTO Office Action for U.S. Appl. No. 10/767,699, Oct. 20, 2008 (3 pages).
USPTO Examiner Interview Summary for U.S. Appl. No. 10/766,965, Sep. 22, 2009 (2 pages).
USPTO Office Action for U.S. Appl. No. 10/766,965, Oct. 28, 2009 (2 pages).
USPTO Examiner Interview Summary for U.S. Appl. No. 10/767,649, Jun. 23, 2009 (2 pages).
USPTO Examiner Interview Summary for U.S. Appl. No. 11/499,833, dated Sep. 3, 2009 (2 pages).
USPTO Examiner Interview Summary for U.S. Appl. No. 11/499,496, dated Jul 27, 2009 (4 pages).
U.S. Appl. No. 60/706,109, filed Aug. 5, 2002, Noviello.
Australian Examiner's Report for Application No. 2005208980, dated Nov. 17, 2009 (2 pages).
Australian Examiner's Report for Application No. 2005208978, dated Nov. 26, 2009 (1 page).
Australian Examiner's Report for Application No. 2005208981, dated Dec. 14, 2009 (3 pages).
USPTO Office Action for U.S. Appl. No. 10/767,649, Aug. 27, 2009 (20 pages).
U.S. Appl. No. 12/945,046, filed Nov. 12, 2010, Daley et al.
USPTO Examiner Interview Summary for U.S. Appl. No. 10/767,699, Dec. 23, 2009 (3 pages).
USPTO Examiner's Answer to Appeal Brief for U.S. Appl. No. 10/767,699, Dec. 24, 2009 (16 pages).
USPTO Examiner's Answer to Appeal Brief for U.S. Appl. No. 10/766,965, Jan. 20, 2010 (19 pages).
USPTO Notice of Allowance and Fees Due and Examiner Interview Summary for U.S. Appl. No. 11/499,496, dated Feb. 17, 2010 (89 pages).
George Simon & Kathryn Trikla, "The Regulation of Specialists and Implications for the Future," Business Lawyer, Nov. 2005, pp. 217-387.
The 'Hybrid Approach': A review of NYSE's Market Structure Proposal, Mondaq Business Briefing, NA, Dec. 9, 2004.
Australian Examiner's Report for Application No. 2006278382, dated Jul. 9, 2009 (3 pages).
USPTO Notice of Allowance and Fees Due for U.S. Appl. No. 11/499,833, dated Mar. 12, 2010 (9 pages).
New AZX Session, Trader's v10 n130, Oct. 1997, p. 4 (p. 20 of EIC search).
The New Trading Landscape for Institutional Investors, Institutional Trades Can Be Costly If Investors Aren't Careful, Norman Harris, Institutional Investor 36, 5, S1 (7) May 2002 (p. 21 of EIC search).
Scientific and Technical Information Center's Search Report EIC 3600, dated Jul. 9, 2009 (88 pages).
International Preliminary Report on Patentability for PCT Application No. PCT/US05/03164, dated Jan. 9, 2007 (4 pages).
Japanese Office Action with English translation for Application No. 2006-551589, dated Apr. 20, 2010 (6 pages).
International Preliminary Report on Patentability for PCT Application No. PCT/US05/03166, dated Jul. 31, 2006 (4 pages).
Japanese Office Action with English translation for Application No. 2006-551590, dated Apr. 20, 2010 (6 pages).
International Preliminary Report on Patentability for PCT Application No. PCT/US05/03163, dated Jan. 23, 2007 (5 pages).
Japanese Office Action with English translation for Application No. 2006-551588, dated Apr. 27, 2010 (8 pages).
U.S. PTO Office Action for U.S. Appl. No. 12/953,407; 16 pages; Mar. 14, 2011.
EP Search Report for Application No. 07754165.4 dated May 31, 2011; 11 pages.
JP Office Action for Application No. 2007-097157;4 pages (including 2 pages Translation).
Japanese Office Action with English translation for Application No. 2006-551587, dated Apr. 20, 2010 (6 pages).
International Preliminary Report on Patentability for PCT Application No. PCT/US05/03168, dated Feb. 13, 2007 (4 pages).
Japanese Office Action with English translation for Application No. 2006-551591, dated Apr. 20, 2010 (6 pages).
International Preliminary Report on Patentability for PCT Application No. PCT/US05/03159, dated Jul. 31, 2006 (6 pages).
Supplementary European Search Report for Application No. EP 05712558, dated Dec. 5, 2008 (2 pages).
International Preliminary Report on Patentability for PCT Application No. PCT/US06/30638, dated Feb. 5, 2008 (5 pages).
International Preliminary Report on Patentability for PCT Application No. PCT/US06/30636, dated Feb. 5, 2008 (5 pages).
Donald L. Luskin, Index Options & Futures: The Complete Guide, Toyo Keizai, Inc., Aug. 9, 1990, p. 32-35 [translation of an English book, originally published by John Wiley & Sons, Inc., 1987].
EPO: "Mitteilung des Europaischen Patentamts vom Oct. 1, 2007 Ober Geschaftsmethoden =Notice from the European Patent Office dated Oct. 1, 2007 concerning business methods =Communique de l'Office europeen des brevets,en date du Oct. 1, 2007, concernant les methodes dans le domaine des activites"Journal Officiel De L'Office Europeen Des Brevets.Official Journal of the European Patent Office. Amtsblattt Des Europaeischen Patentamts, OEB, Munchen, DE, vol. 30, No. 11, Nov. 1, 2007, pp. 592-593, XP007905525 1SSN: 0170-9291 (2 pages).
USPTO Supplemental Notice of Allowance and Fees Due for U.S. Appl. No. 11/499,496, dated May 26, 2010 (4 pages).
USPTO Dismissal of Appeal for U.S. Appl. No. 10/766,965, Jun. 7, 2010 (3 pages).
European Patent Office Communication and Official Action for Application No. 05712562.7, dated May 18, 2010 (6 pages).
European Patent Office Communication and Official Action for Application No. 05712563.5, dated May 18, 2010 (6 pages).
European Patent Office Communication and Official Action for Application No. 05712558.5, dated May 18, 2010 (6 pages).
USPTO Notice of Allowance and Fees Due for U.S. Appl. No. 10/767,588, Jun. 25, 2010 (7 pages).
European Patent Office Communication and Extended European Search Report for Application No. 06789488.1, dated Jul. 6, 2010 (10 pages).
European Patent Office Communication and Extended European Search Report for Application No. 06789490.7, dated Jul. 7, 2010 (8 pages).
Australian Examiner's Report for Application No. 2005208977, dated Nov. 20, 2009 (8 pages).
USPTO Office Action for U.S. Appl. No. 10/767,546, Aug. 6, 2010 (39 pages).
USPTO Notice of Allowance and Fees Due for U.S. Appl. No. 10/767,588, Jul. 22, 2010 (7 pages).
USPTO Supplemental Notice of Allowance and Fees Due for U.S. Appl. No. 11/499,496, dated Jul. 23, 2010 (9 pages).
USPTO Supplemental Notice of Allowance and Fees Due for U.S. Appl. No. 11/499,496, dated Aug. 10, 2010 (4 pages).
Japanese Office Action with English translation for Application No. 2006-551591, dated Aug. 24, 2010 (4 pages).
Japanese Office Action with English translation for Application No. 2006-551590, dated Aug. 24, 2010 (6 pages).
Daisuke Ochiai, "Electronic Finance and Security Trading, 'London Stock Exchange Transfers to New Trading System'", Capital Market Quarterly, Autumn 1997, vol. 1, No. 2, Nomura Research Institute, Nov. 1,1997, pp. 102-108.
Japanese Office Action with English translation for Application No. 2006-551588, dated Aug. 31, 2010 (8 pages).
Japanese Office Action with English translation for Application No. 2006-551589, dated Aug. 31, 2010 (7 pages).
USPTO Notice of Allowance and Fees Due for U.S. Appl. No. 10/767,588, Sep. 7, 2010 (3 pages).
USPTO Notice of Allowance and Fees Due for U.S. Appl. No. 11/499,833, dated Sep. 15, 2010 (10 pages).
USPTO Notice of Allowance and Fees Due for U.S. Appl. No. 10/767,588, Sep. 21, 2010 (7 pages).
Australian Notice of Acceptance for Application No. 2005208980, dated Sep. 23, 2010 (3 pages).
Japanese Office Action with English translation for Application No. 2008-525266, dated Sep. 21, 2010 (7 pages).
Australian Notice of Acceptance for Application No. 2005208978, dated Nov. 30, 2010 (3 pages).

Australian Examiner's Report for Application No. 2005208977, dated Dec. 2, 2010 (1 page).
Japanese Office Action with English translation for Application No. 2008-525268, dated Nov. 24, 2010 (7 pages).
Australian Notice of Acceptance for Application No. 2005208981, dated Dec. 14, 2010 (3 pages).
Australian Notice of Acceptance for Application No. 2005208979, dated Dec. 20, 2010 (3 pages).
Japanese Office Action with English translation for Application No. 2006-551587, dated Nov. 24, 2010 (6 pages).
Japanese Office Action with English translation for Application No. 2006-551589, dated Dec. 7, 2010 (6 pages).
USPTO Office Action for U.S. Appl. No. 10/767,699, Dec. 22, 2010 (13 pages).
Japanese Office Action with English translation for Application No. 2006-551590, dated Jan. 11, 2011 (4 pages).
Japanese Office Action with English translation for Application No. 2006-551591, dated Jan. 11, 2011 (4 pages).
Australian Notice of Acceptance for Application No. 2006278382, dated Apr. 11, 2011 (3 pages).
USPTO Office Action for U.S. Appl. No. 10/767,546, May 20, 2011 (47 pages).
Japanese Office Action with English translation for Application No. 2006-551588, mailed Apr. 26, 2011 (6 pages).
Japanese Office Action with English translation for Application No. 2008-525268, mailed Jun. 21, 2011 (4 pages).
Japanese Office Action with English translation for Application No. 2008-525266, mailed Jun. 28, 2011 (7 pages).
Japanese Office Action with English translation for Application No. 2006-551587, mailed Jul. 12, 2011 (6 pages).
Australian Notice of Acceptance for Application No. 2005208977, dated Aug. 24, 2011 (3 pages).
USPTO Office Action for U.S. Appl. No. 10/767,699, Sep. 15, 2011 (13 pages).
Lee, et. al., "R-Trader: An automatic Stock Trading System based on reinforcement Learning," The British Library, pp. 785-794, (Abstract translated).
Tan, "Using genetic algorithm to optimize an oscillator-based market timing system," The British Library, pp. B115-B122.
Ye, et. al., Application of Genetic Algorithm to Optimal Portfolio with Risk Control,: The British Library, pp. 351-354.
Steiner, et. al., "Portfolio optimization with a neural network implementation of the coherent market hypothesis," The British Library, Elsevier Science B.V., pp. 27-40; rev. Nov. 11, 1995.
Lin, et. al., "The Applications of Genetic Algorithms in Stock Market Data Mining Optimisation," Faculty of Information Technology, University of Technology, 9 pages; 2000.
Fukutomer, et. al., "Bidding market based on single price model with network constraints," IEEE, pp. 1245-1250 plus 4 pages; 2004.
Wachi, et. al., "Application for Single price auction model (SPA) in AC Network," pp. 81-89.
Walman; Technology Takes to Securities TradingIIEE, Spectrum; pp. 60-65; Feb. 1997.
Schmerken; Cybercop to Introduce Trading via CBOE; Wall Street & technology; coversheet plus p. 50; Jan. 2000.
Zeroual; An Open Distributed Request Propagation Approach for Trading Services; Proceedings of the Second International Conference on Machine Learning and Cybernetics, Xi'an; pp. 3253-3258; Nov. 2003.
Notification of Transmittal of the international Search Report and the Written Opinion of the International Searching Authority, or the Declaration for International Application No. PCT/US06/22441; 8 pages; May 1, 2007.
Notification of Transmittal of the international Search Report and the Written Opinion of the International Searching Authority, or the Declaration for International Application No. PCT/US07/07602; 8 pages; Sep. 24, 2007.
U.S. PTO Office Action for U.S. Appl. No. 11/398,241; 11 pages; Dec. 15, 2008.
U.S. PTO Office Action for U.S. Appl. No. 11/146,646; 12 pages; Jan. 25, 2009.
U.S. PTO Office Action for U.S. Appl. No. 11/398,241; 14 pages; Oct. 14, 2009.
U.S. PTO Office Action for U.S. Appl. No. 11/146,646; 13 pages; Jan. 19, 2010.
Notice of Allowance for U.S. Appl. No. 11/146,646; 7 pages.
Hasbrouck et al.: Limit orders and volatility in a Hybrid Market: The Island ECN, Department of Finance, Stern School, NYU, Sep. 26, 2001, pp. 1-54.
Market Access Subcommittee: Best Practices for organized electronic markets, Commodity Futures Trading Commission, Nov. 21, 2001, pp. 1-22.
Bongiovannu et al.: Lets play hide and seek: The location and size of undisclosed limit order volume, The Journal of trading, Summer 2006, pp. 34-46.
Pre-Brief Appeal Conference Decision for U.S. Appl. No. 11/398,241; 2 pages; May 17, 2010.
EP Supplementary Search Report and Opinion dated Aug. 20, 2009; 6 pages; (this app has been Abandoned).
AU Examination Report for Application No. 2007201453 dated Jul. 30, 2010; 1 page.
AU Examination Report for Application No. 2006254819 dated Oct. 28, 2010; 2 pages.

* cited by examiner

| | TRADING ORDER | PRODUCT | DISCLOSED QUANTITY | RESERVED QUANTITY | MARKET CENTER |
|---|---|---|---|---|---|
| 60 | BUY | XYZ | 10 UNITS | 10 UNITS | 18a |
| 62 | BUY | XYZ | 10 UNITS | 0 UNITS | 18a |
| 64 | BUY | XYZ | 10 UNITS | UNKNOWN | 18b |
| 66 | BUY | XYZ | 10 UNITS | UNKNOWN | 18b |
| 68 | BUY | XYZ | 5 UNITS | 5 UNITS | 18a |
| 70 | BUY | XYZ | 5 UNITS | 5 UNITS | 18b |
| 72 | BUY | XYZ | 5 UNITS | 5 UNITS | 18a |

TRADING ORDER ROUTING

CROSS-REFERENCE TO RELATED APPLICATION

The present application is a continuation of U.S. Patent Application Ser. No. 11/146,646 entitled "System and Method for Routing a Trading Order Based Upon Quantity," filed Jun. 7, 2005, now U.S. Pat. No. 7,840,477 which is incorporated by reference herein in its entirety.

TECHNICAL FIELD OF THE INVENTION

The present invention relates generally to electronic trading and more specifically to a system for routing a trading order based upon quantity.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

An apparatus for routing trading orders comprises a memory and a processor. In one mode of operation, the memory stores first trading information associated with a first buy order placed with a first market center. The first buy order is associated with a product and the first trading information comprises a disclosed quantity of the product and a reserved quantity of the product. The memory also stores second trading information associated with a second buy order placed with a second market center. The second buy order is associated with the product and the second trading information comprises a disclosed quantity of the product and a reserved quantity of the product. The processor is coupled to the memory and receives a sell order associated with a quantity of the product. The processor further cancels at least a portion of the second buy order placed with the second market center for placement with the first market center. The canceled portion of the second buy order is determined based at least in part upon the second trading information. The processor further routes at least one additional sell order to the first market center having a quantity that is based upon at least one of the first trading information and the canceled portion of the second buy order.

In another mode of operation, the memory stores first trading information associated with a first sell order placed with a first market center. The first sell order is associated with a product and the first trading information comprises a disclosed quantity of the product and a reserved quantity of the product. The memory also stores second trading information associated with a second sell order placed with a second market center. The second sell order is associated with the product and the second trading information comprises a disclosed quantity of the product and a reserved quantity of the product. The processor is coupled to the memory and receives a buy order associated with a quantity of the product. The processor further cancels at least a portion of the second sell order placed with the second market center for placement with the first market center. The canceled portion of the second sell order is determined based at least in part upon the second trading information. The processor further routes at least one additional buy order to the first market center having a quantity that is based upon at least one of the first trading information and the canceled portion of the second sell order.

Various embodiments of the present invention may benefit from numerous advantages. It should be noted that one or more embodiments may benefit from some, none, or all of the advantages discussed below.

In general, the system of the present invention optimizes the processing of trading orders by routing trading orders to particular market centers based upon quantity. In particular, the trading platform of the system may aggregate trading orders for communication to a particular, preferred, market center. By aggregating trading orders, the system may reduce the overall number of trading orders that are communicated to market centers and, in doing so, the system may free up network resources in the system to perform other processes, such as to handle other trading orders. Therefore, these techniques may lead to faster and more efficient processing and routing of trading orders.

In addition, the trading platform of the present system stores trading information regarding previous trading orders (e.g., either buy orders or sell orders) that have been placed with various market centers. When the trading platform receives new trading orders for the same product (e.g., such as a buy order), it can refer to the stored trading information (e.g., such as for previous sell orders) to determine where to route the current trading orders in such a way that the trading orders can be fulfilled promptly. In other words, the trading platform can route current trading orders to particular market centers where it has a good chance of being matched with a prior trading order for the same product. By routing trading orders in this way, the trading platform of the present system allows the associated market centers to clear out previous trading orders from its queue and, in doing so, free up memory space and processing resources at the market center. This leads to a faster and more efficient trading system.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
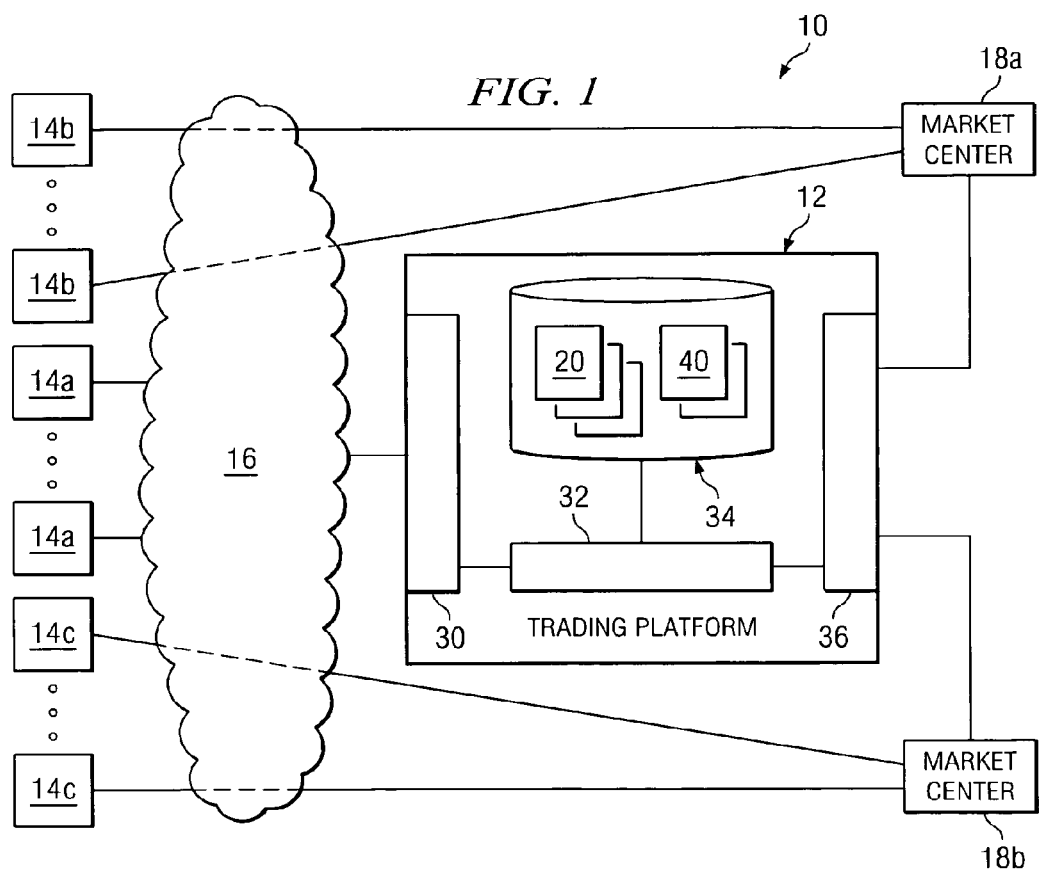
FIG. 1 illustrates one embodiment of a trading system in accordance with the present invention.

FIG. 1 illustrates one embodiment of a trading system 10 that includes a trading platform 12 coupled to a variety of clients 14 using network 16 and further coupled to market centers 18. In general, system 10 optimizes the processing of trading orders 20 by routing trading orders 20 to particular market centers 18 based upon the quantity of product indicated in the order 20 and the quantity of product available at one or more market centers 18.

A trading order 20 comprises an order to buy a particular quantity of a particular trading product (e.g., bid request) or an order to sell a particular quantity of a particular trading product (e.g., offer request). The quantity of the trading product to be bought or sold is referred to herein as the "total quantity." In particular embodiments, a trading order 20 may also specify a target price (e.g., target bid price and target offer price) for the trading product. Although the following description of system 10 is detailed with respect to trading equities, the trading product that forms the basis of a given trading order 20 may comprise any type of goods, services, financial instruments, commodities, etc. Examples of financial instruments include, but are not limited to, stocks, bonds, and futures contracts.

Clients 14 comprise any suitable local or remote end-user devices that may be used by traders to access one or more elements of trading system 10, such as trading platform 12. For example, a client 14 may comprise a computer, workstation, telephone, an Internet browser, an electronic notebook, a Personal Digital Assistant (PDA), a pager, or any other suitable device (wireless or otherwise), component, or element capable of receiving, processing, storing, and/or communicating information with other components of system 10. A client 14 may also comprise any suitable interface for a trader such as a display, a microphone, a keyboard, or any other appropriate terminal equipment according to particular configurations and arrangements. It will be understood that there may be any number of clients 14, such as clients 14a, coupled to trading platform 12. In addition, there may be any number of clients 14, such as clients 14b and 14c, coupled to market centers 18 without using trading platform 12. Clients 14a, 14b, and 14c shall be collectively referred to as clients 14.

Although clients 14 are described herein as being used by "traders," it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 20 in system 10.

Network 16 is a communication platform operable to exchange data or information between clients 14 and trading platform 12 and/or market centers 18. Network 16 represents an Internet architecture in a particular embodiment of the present invention, which provides traders operating clients 14 with the ability to electronically execute trades or initiate transactions to be delivered to platform 12 and/or market centers 18. Network 16 could also be a plain old telephone system (POTS), which traders could use to perform the same operations or functions. Such transactions may be assisted by a broker associated with platform 12 or manually keyed into a telephone or other suitable electronic equipment in order to request that a transaction be executed. In other embodiments, network 16 could be any packet data network (PDN) offering a communications interface or exchange between any two nodes in system 10. Network 16 may further comprise any combination of local area network (LAN), metropolitan area network (MAN), wide area network (WAN), wireless local area network (WLAN), virtual private network (VPN), intranet, or any other appropriate architecture or system that facilitates communications between clients 14 and platform 12 and/or market centers 18.

Market centers 18 comprise all manner of order execution venues including exchanges, Electronic Communication Networks (ECNs), Alternative Trading Systems (ATSs), market makers, or any other suitable market participants. Each market center 18 maintains a bid and offer price in a given trading product by standing ready, willing, and able to buy or sell at publicly quoted prices, also referred to as market center prices.

Different market centers 18 provide different market center prices for particular trading products. For example, a particular market center 18 may offer a particular bid price and/or offer price for a particular trading product, while another market center 18 may offer a different bid price and/or offer price for the same trading product. Particular market centers 18 also charge a transaction cost in order to execute a trading order 20 that remains in their order book for more than a certain length of time.

In addition, different market centers 18 have adopted different policies regarding the disclosure to market makers of various details of a trading order 20, such as, for example, the size of a trading order 20. For example, a client 14 may place a trading order 20 with a "reserved quantity." Such a reserved quantity comprises a portion of the total quantity of the trading order 20, and allows the client 14 to enter a large order while having the market center 18 only display a portion of it to the rest of the market. In this case, a first quantity of the trading order 20 is "disclosed" and a second quantity of the trading order 20 is "reserved." Particular market centers 18, such as market center 18a, comprise "cooperative" market centers 18 in that they disclose both the disclosed quantity and the reserved quantity of a trading order 20 to trading platform 12. Other market centers 18, such as market center 18b, comprise "non-cooperative" market centers 18 in that they disclose the disclosed quantity of the trading order to trading platform 12, but do not disclose the reserved quantity of the trading order 20 to trading platform 12.

Trading platform 12 is a trading architecture that facilitates the routing, matching, and otherwise processing of trading orders 20. Platform 12 may comprise a management center or a headquartering office for any person, business, or entity that seeks to manage the trading of orders 20. Accordingly, platform 12 may include any suitable combination of hardware, software, personnel, devices, components, elements, or objects that may be utilized or implemented to achieve the operations and functions of an administrative body or a supervising entity that manages or administers a trading environment. In the particular embodiment described herein, trading platform 12 includes a number of interfaces, processors and memory devices that are executed to support the order processing activities of system 10.

Client interface 30 coupled to network 16 supports communication between clients 14 and the various components of platform 12. In a particular embodiment, client interface 30 comprises a transaction server that receives trading orders 20 communicated by clients 14.

Processor 32 is coupled to client interface 30 and performs a number of order handling tasks within platform 12. In particular, processor 32 records trading orders 20 in memory 34 and routes trading orders 20 to market centers 18. Processor 32 comprises any suitable combination of hardware and software implemented in one or more modules to provide the described function or operation. Processor 32 may execute program instructions stored in memory 34 and comprise processing components to execute the program instructions. Market center interface 36 supports communication between platform 12 and market centers 18.

Memory 34 comprises any suitable arrangement of random access memory (RAM), read only memory (ROM), magnetic computer disk, CD-ROM, or other magnetic or optical storage media, or any other volatile or non-volatile memory devices that stores one or more files, lists, tables, or other arrangements of information, such as trading orders 20 and trading information 40. Although FIG. 1 illustrates memory 34 as internal to trading platform 12, it should be understood that memory 34 may be internal or external to components of system 10, depending on particular implementations. Also, memory 34 illustrated in FIG. 1 may be separate or integral to other memory devices to achieve any suitable arrangement of memory devices for use in system 10.

It should be noted that the internal structure of trading platform 12, and the interfaces, processors, and memory devices associated therewith, is malleable and can be readily changed, modified, rearranged, or reconfigured in order to achieve its intended operations.

In operation, clients 14 place a variety of trading orders 20 with market centers 18 with or without the assistance of trading platform 12. Memory 34 stores trading information 40 associated with these trading orders 20. For any given trading order 20, trading information 40 may comprise information about whether the trading order 20 is a buy order or a sell order, the underlying trading product, the total quantity, pricing information, and any other suitable information regarding the trading order 20. For those trading orders 20 placed with market center 18a but not by trading platform 12, for example, trading information 40 may include both the disclosed quantity of the underlying trading product as well as the reserved quantity of the trading product. For those trading orders 20 placed with market center 18b but not by trading platform 12, for example, trading information 40 may include only the disclosed quantity of the underlying trading product. For those trading orders 20 placed with either market center 18a or 18b by trading platform 12, trading information 20 may include both the disclosed quantity of the underlying trading product as well as the reserved quantity of the trading product.

When trading platform 12 receives additional trading orders 20 from clients 14a, processor 32 routes additional trading orders 20 to one or more market centers 18 based upon trading information 40 stored in memory 34. For example, if trading platform 12 receives a sell order 20 associated with a quantity of a particular product, processor 32 routes at least one additional sell order 20 to one or more of market centers 18 based upon trading information 40 associated with previous buy orders 20 for the same product. Similarly, if trading platform 12 receives a buy order 20 associated with a quantity of a particular product, processor 32 routes at least one additional buy order 20 to one or more of market centers 18 based upon trading information 40 associated with previous sell orders 20 for the same product. While this description is detailed with reference to the trading platform 12 receiving one or more trading orders 20 and communicating additional trading orders 20 to market centers 18, it should be understood that one or more of the additional trading orders 20 may comprise some, none, or all of a trading order 20 received by trading platform 12.

In routing these additional trading orders 20 to market centers 18, trading platform 12 may show a preference for one market center 18, such as cooperative market center 18a, over another market center 18, such as non-cooperative market center 18b. In particular, trading platform 12 may seek to fulfill as much as possible of the total quantity of a trading order 20 for a particular product at market center 18a before seeking to fulfill any portion of the total quantity of the trading order 20 at market center 18b. In addition, where trading platform 12 previously placed a trading order 20, such as a buy order 20 for a particular product, with market center 18b, it may cancel such previous trading order 20 and place it at market center 18a so that a subsequently received trading order 20, such as a sell order 20 for the same product, may be fulfilled (at least in part) at market center 18a rather than market center 18b. The portion of the trading order 20 that is canceled at market center 18b and placed instead at market center 18a is based at least in part upon trading information 40.

Figures 2, 3:
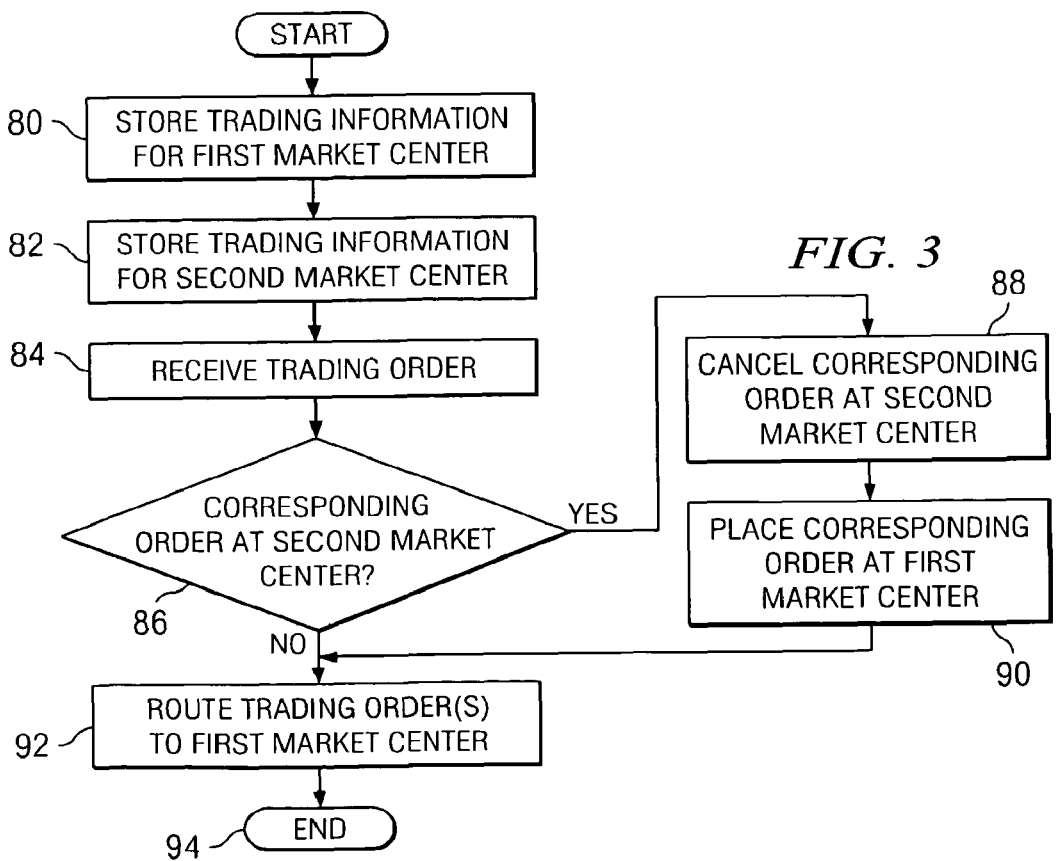
FIG. 2 illustrates one embodiment of trading information used by the system illustrated in FIG. 1.
FIG. 3 illustrates a flowchart of an exemplary method for routing trading orders.

FIG. 2 illustrates one embodiment of trading information 40 used by system 10. Trading information 40 is illustrated in a table having columns 50-58 and rows 60-72. Columns 50-58 illustrate at least a portion of the types of information that comprise trading information 40, including the type of trading orders 20 (e.g., buy order or sell order) in column 50; the product that is the subject of the trading order 20 in column 52; the disclosed quantity of the trading order 50 in column 54; the reserved quantity of the trading order 50 in column 56; and the market center 18a or 18a to which a particular trading order 20 was routed in column 58. Each row 60-72 represents a trading order 20 previously placed or currently in place with a market center 18, whether it was or was not placed by trading platform 12. It should be understood that trading information 40 may be stored in any suitable arrangement of data, whether formatted in a table or any other data structure.

Several examples of the operation of system 10 will now be described with reference to trading information 40 illustrated in FIG. 2. At the outset, however, suppose clients 14b placed trading orders 20 with market center 18a, as illustrated in rows 60 and 62, without the assistance of trading platform 12. In particular, the first trading order 20, illustrated in row 60, may be a buy order 20 for a product "XYZ" with a disclosed quantity of ten units and a reserved quantity of ten units. The second trading order 20, illustrated in row 62, may be a buy order 20 for the product "XYZ" with a disclosed quantity of ten units and a reserved quantity of zero units. Suppose further that clients 14c placed trading orders 20 with market center 18b, as illustrated in rows 64 and 66, without the assistance of trading platform 12. In particular, the first trading order 20, illustrated in row 64, may be a buy order 20 for a product "XYZ" with a disclosed quantity of ten units and a reserved quantity that remains unknown since market center 18b is "non-cooperative" with trading platform 12. The second trading order 20, illustrated in row 66, may be a buy order 20 for the product "XYZ" with a disclosed quantity of ten units and a reserved quantity that is unknown also.

Therefore, at this point, trading information 40 indicates that a disclosed quantity of forty units of product "XYZ" is being bid upon at market centers 18a and 18b (as indicated by rows 60-66 at column 54), that a reserved quantity of ten units of product "XYZ" is being bid upon at market center 18a (as indicated by row 60 at column 56), and that an unknown reserved quantity of product "XYZ" is being bid upon at market center 18b (as indicated by rows 64 and 66 at column 56).

In the first example operation, assume that trading platform 12 receives a sell order 20 for product "XYZ" for a total quantity of thirty units. Assume further that platform 12 preferences cooperative market center 18a in its order routing decisions. Because platform 12 stores trading information 40 indicating that thirty units of product "XYZ" is currently being bid upon in market center 18a, trading platform 12 routes a sell order 20 for product "XYZ" for the total quantity of thirty units to market center 18a where it can be fulfilled. By fulfilling as much as possible (e.g., thirty units) of the total quantity of the sell order 20 (e.g., thirty units) at market center 18a to the exclusion of market center 18b, trading platform 12 exhibits a preference for cooperative market center 18a in its order routing process.

In the second example operation, assume that trading platform 12 receives a sell order 20 for product "XYZ" for a total quantity of fifty units. Assume further that platform 12 preferences cooperative market center 18a in its order routing decisions. Because trading information 40 indicates that thirty units of product "XYZ" is currently being bid upon in market center 18a, trading platform 12 routes a sell order 20 for product "XYZ" for a quantity of thirty units to market center 18a where it can be fulfilled. Because trading platform 12 indicates that twenty units of product "XYZ" is currently being bid upon in market center 18b, trading platform 12 routes a sell order 20 for product "XYZ" for the remaining quantity of twenty units to market center 18b where it can be fulfilled. By fulfilling as much as possible (e.g., thirty units) of the total quantity of the sell order 20 (e.g., fifty units) at market center 18a before fulfilling the remainder (e.g., twenty units) at market center 18b, trading platform 12 exhibits a preference for cooperative market center 18a in its order routing process.

In the third example, assume further that trading platform 12 receives an additional buy order 20 for product "XYZ" in the amount of twenty units (e.g., ten units disclosed and ten units reserved) from a client 14a. Per the instructions of client 14a, assume that trading platform 12 places a buy order 20 with market center 18a for product "XYZ" with a disclosed quantity of five units and a reserved quantity of five units, as illustrated in row 68. Assume further that trading platform 12 places a buy order 20 with market center 18b for product "XYZ" with a disclosed quantity of five units and a reserved quantity of five units, as illustrated in row 70. At this point, trading information 40 indicates that a disclosed quantity of fifty units of product "XYZ" is being bid upon at market centers 18a and 18b (as indicated by rows 60-70 at column 54), that a reserved quantity of fifteen units of product "XYZ" is being bid upon at market center 18a (as indicated by rows 60 and 68 at column 56), and that a reserved quantity of five units of product "XYZ" is being bid upon at market center 18b (as indicated by row 70 at column 56).

Now, assume that trading platform 12 receives a sell order 20 for product "XYZ" for a total quantity of seventy-five units. Assume further that platform 12 preferences cooperative market center 18a in its order routing decisions. Because trading information 40 indicates that a total of forty units of product "XYZ" is currently being bid upon in market center 18a (as indicated by rows 60, 62, and 68), trading platform 12 routes a sell order 20 for product "XYZ" for a quantity of forty units to market center 18a where it can be fulfilled. Next, trading information 40 indicates that trading platform 12 placed with market center 18b a buy order 20 for product "XYZ" for a disclosed quantity of five units and a reserved quantity of five units, for a total quantity of ten units (as indicated in row 70). Assume further that platform 12 preferences cooperative market center 18a in its order routing decisions. As a result, platform 12 cancels the buy order 20 placed with market center 18b detailed in row 70 (as indicated by the dashed line through row 70) and, instead, places the buy order 20 with market center 18a (as indicated in row 72). Now, trading information 40 indicates that ten units of product "XYZ" is currently being bid upon in market center 18a (as indicated by row 72). Therefore, trading platform 12 routes a sell order 20 for product "XYZ" for a quantity of ten units to market center 18a where it can be fulfilled. The cancellation of the buy order 20 with market center 18b and the placement of the buy order 20 with market center 18a may occur simultaneously or sequentially in time.

Of the original quantity of seventy-five units in the sell order 20 received by trading platform 12, fifty units have now been fulfilled at market center 18a, leaving an additional twenty-five units unfulfilled. However, trading information 40 indicates that twenty units of product "XYZ" is currently being bid upon in market center 18b (as indicated by rows 64 and 66). Therefore, trading platform 12 routes a sell order 20 for product "XYZ" for a quantity of twenty units to market center 18b where it can be fulfilled. The five units of the sell order 20 that remain unfulfilled may be routed to market center 18a, market center 18b, or both per the instructions of the client 14a or the order routing priorities of trading platform 12. By fulfilling as much as possible (e.g., forty units) of the total quantity of the sell order 20 (e.g., seventy-five units) at market center 18a, and by canceling a buy order 20 previously placed with market center 18b (e.g., for ten units) for placement at market center 18a so that another ten units of the sell order 20 could be fulfilled at market center 18a, trading platform 12 exhibits a preference for cooperative market center 18a in its order routing process.

Although the previous examples are detailed with reference to trading information 40 detailing buy orders 20 and trading platform 12 routing sell orders 40 accordingly, it should be understood that trading information 40 can detail any number and combination of buy orders 20 and sell orders 20, and that trading platform 12 can route any number and combination of buy orders 20 and sell orders 20 using the techniques described above.

FIG. 3 illustrates a flowchart of an exemplary method for routing trading orders 20. The method begins at steps 80 and 82 where trading platform 12 stores trading information 40 associated with one or more trading orders 20 (e.g., buy orders 20 and/or sell orders 20 for a particular product) placed with market center 18a, and trading information 40 associated with one or more trading orders 20 (e.g., buy orders 20 and/or sell orders 20 for a particular product) placed with market center 18b. At least a portion of this trading information 40 may be associated with trading orders 20 placed with market centers 18a or 18b by trading platform 12. Execution proceeds to step 84 where trading platform 12 receives a trading order 20 (e.g., buy order 20 or sell order 20) for a particular quantity of the particular product.

At step 86, trading platform 12 determines whether a corresponding trading order 20 for the particular product was placed by trading platform 12 at market center 18b. For example, if the trading order 20 received at step 84 is a buy order 20, trading platform 12 determines at step 86 whether a sell order 20 for the particular product was placed by trading platform 12 at market center 18b. If the trading order 20 received at step 84 is a sell order 20, trading platform 12 determines at step 86 whether a buy order 20 for the particular product was placed by trading platform 12 at market center 18b. If so, execution proceeds to step 88 where trading platform 12 cancels at least a portion of the corresponding order 20 at market center 18b. Execution proceeds to step 90 where trading platform 12 places the corresponding order 20 at market center 18a.

Upon placing the corresponding order 20 at market center 18a at step 90, or upon determining that a corresponding order 20 was not placed by trading platform 12 at market center 18b at step 86, execution proceeds to step 92 where trading platform 12 routes one or more trading orders 20 to market center 18a to fulfill at least a portion of the trading order 20 received at step 84. The trading order 20 received at step 84 may be fulfilled at least in part by corresponding trading orders 20 that were originally placed at market center 18a (whether by trading platform 12 or not) and/or by corresponding trading orders 20 that were placed at market center 18a by trading platform 12 at step 90 in association with a corresponding trading order 20 that was canceled at market center 18b at step 88. In this regard, trading platform 12 exhibits a preference for cooperative market center 18a in its order routing process.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus for routing trading orders, comprising:
at least one processor of a trading platform; and
a memory, coupled to the at least one processor, that stores instructions which, when executed by the at least one processor, direct the at least one processor to perform a method comprising:
receiving from a first market center first trading information about a first plurality of orders, the first trading information comprising a respective disclosed quantity and a respective reserved quantity for each of the first plurality of orders;
receiving from a second market center second trading information about a second plurality of orders, the second trading information comprising a respective disclosed quantity for each of the second plurality of orders, each of the second plurality of orders comprising a respective reserved quantity, in which the trading platform does not receive the reserved quantities for any of the second plurality of orders;
receiving a trading order;
determining that the first market center provided to the trading platform the respective reserved quantities for each of the first plurality of orders;
determining that the second market center did not provide to the trading platform reserved quantities for any of the second plurality of orders;
based on (1) the determination that the first market center provided to the trading platform the respective reserved quantities for each of the first plurality of orders and (2) the determination that the second market center did not provide to the trading platform reserved quantities for any of the second plurality of orders, routing at least a portion of the trading order to the first market center, in which the act of routing at least a portion of the trading order to the first market center comprises:
determining a quantity of the trading order that can be fulfilled at the first market center; and
routing the determined quantity of the trading order to the first market center for fulfillment of the determined quantity;
determining that a remaining quality of the trading order can be fulfilled at the second market center; and
routing the remaining quantity to the second market center.

2. The apparatus of claim 1, the method further comprising:
determining that at least a first order at the first market center is contra to the received trading order and is available to be at least partially matched with the trading order; and
receiving information about at least a second order that is contra to the received order at the second market center and is available to be at least partially matched with the trading order,
in which the act of routing the trading order to the first market center is further based at least in part on (3) the determination that the first order at the first market center is contra to the received trading order and is available to be at least partially matched with the trading order, and
in which the act of routing the trading order to the first market center occurs after receiving the information about the second order.

3. The apparatus of claim 1, the method further comprising:
receiving a first order for the financial instrument;
routing the first order to the second market center;
determining a quantity of the trading order that can be fulfilled at the first market center;
determining that at least a portion of a remaining quantity of the trading order can be matched with the first order after the determined quantity of the trading order is fulfilled at the first market center, in which the first order is contra to the trading order; and
after routing at least a portion of the trading order to the first market center, and based on (1) the determination that the first market center provided to the trading platform reserved quantities for each of the first plurality of orders, (2) the determination that the second market center did not provide to the trading platform reserved quantities for each of the second plurality of orders, and (3) the determination that at least a portion of the remaining quantity can be matched with the first order after the determined quantity is fulfilled at the first market center:
cancelling at least a portion of the first order at the second market center; and
routing to the first market center a second order that is contra to the trading order and equal in quantity to the cancelled portion of the first order, in which the second order is matched with at least a portion of the remaining quantity of the trading order.

4. The apparatus of claim 3, in which the act of cancelling at least a portion of the first order comprises cancelling all of the quantity of the first order at the second market center, and in which the second order is equal in quantity to the first trading order.

5. The apparatus of claim 1, in which the act of routing at least a portion of the trading order to the first market center comprises routing all of the quantity of the trading order to the first market center.

6. The apparatus of claim 1, in which the first and second orders each comprise buy orders for the trading product, and in which the third order comprises a sell order for the trading product.

7. The apparatus of claim 1, in which the first and second orders each comprise sell orders for the trading product, and in which the third order comprises a buy order for the trading product.

8. The apparatus of claim 1, in which the first market center comprises a cooperative exchange such that the first market center discloses to the trading platform reserved quantities of trading orders placed by trading participants other than the trading platform pursuant to a first disclosure policy associated with the first market center, and in which the second market center comprises a non-cooperative exchange such that the second market center does not disclose to the trading platform reserved quantities of trading orders placed by the other trading participants pursuant to a second disclosure policy associated with the second market center.

9. A method for routing trading orders, comprising:
receiving, by at least one processor of a trading platform, from a first market center first trading information about a first plurality of orders, the first trading information comprising a respective disclosed quantity and a respective reserved quantity for each of the first plurality of orders;
receiving, by the at least one processor, from a second market center second trading information about a second plurality of orders, the second trading information comprising a respective disclosed quantity for each of the second plurality of orders, each of the second plurality of orders comprising a respective reserved quantity, in which the trading platform does not receive the reserved quantities for any of the second plurality of orders;
receiving, by the at least one processor, a trading order;
determining, by the at least one processor, that the first market center provided to the trading platform the respective reserved quantities for each of the first plurality of orders;
determining, by the at least one processor, that the second market center did not provide to the trading platform reserved quantities for any of the second plurality of orders;
based on (1) the determination that the first market center provided to the trading platform the respective reserved quantities for each of the first plurality of orders and (2) the determination that the second market center did not provide to the trading platform reserved quantities for any of the second plurality of orders, routing, by the at least one processor, at least a portion of the trading order to the first market center, in which the act of routing at least a portion of the trading order to the first market center comprises:
determining a quantity of the trading order that can be fulfilled at the first market center; and
routing the determined quantity of the trading order to the first market center for fulfillment of the determined quantity;
determining that a remaining quantity of the trading order can be fulfilled at the second market center; and
routing the remaining quantity to the second market center.

10. The method of claim 1, the method further comprising:
determining that at least a first order at the first market center is contra to the received trading order and is available to be at least partially matched with the trading order; and
receiving information about at least a second order that is contra to the received order at the second market center and is available to be at least partially matched with the trading order,
in which the act of routing the trading order to the first market center is further based at least in part on (3) the determination that the first order at the first market center is contra to the received trading order and is available to be at least partially matched with the trading order, and
in which the act of routing the trading order to the first market center occurs after receiving the information about the second order.

11. The method of claim 9, the method further comprising:
receiving a first order for the financial instrument;
routing the first order to the second market center;
determining a quantity of the trading order that can be fulfilled at the first market center;
determining that at least a portion of a remaining quantity of the trading order can be matched with the first order after the determined quantity of the trading order is fulfilled at the first market center, in which the first order is contra to the trading order; and
after routing at least a portion of the trading order to the first market center, and based on (1) the determination that the first market center provided to the trading platform reserved quantities for each of the first plurality of orders, (2) the determination that the second market center did not provide to the trading platform reserved quantities for each of the second plurality of orders, and (3) the determination that at least a portion of the remaining quantity can be matched with the first order after the determined quantity is fulfilled at the first market center:
cancelling at least a portion of the first order at the second market center; and
routing to the first market center a second order that is contra to the trading order and equal in quantity to the cancelled portion of the first order, in which the second order is matched with at least a portion of the remaining quantity of the trading order.

12. The method of claim 11, in which the act of cancelling at least a portion of the first order comprises cancelling all of the quantity of the first order at the second market center, and in which the second order is equal in quantity to the first trading order.

13. The method of claim 9, in which the act of routing at least a portion of the trading order to the first market center comprises routing all of the quantity of the trading order to the first market center.

14. The method of claim 9, in which the first and second orders each comprise buy orders for the trading product, and in which the third order comprises a sell order for the trading product.

15. The method of claim 9, in which the first and second orders each comprise sell orders for the trading product, and in which the third order comprises a buy order for the trading product.

16. The method of claim 9, in which the first market center comprises a cooperative exchange such that the first market center discloses to the trading platform reserved quantities of trading orders placed by trading participants other than the trading platform pursuant to a first disclosure policy associated with the first market center, and in which the second market center comprises a non-cooperative exchange such that the second market center does not disclose to the trading platform reserved quantities of trading orders placed by the other trading participants pursuant to a second disclosure policy associated with the second market center.

17. The method of claim 9, in which the act of routing at least a portion of the trading order to the first market center comprises:

based on (1) the determination the first market center provided to the trading platform reserved quantities for each of the first plurality of orders and (2) the determination that the second market center did not provide to the trading platform reserved quantities for each of the second plurality of orders, routing at least a portion of the trading order to the first market center such that no portion of the trading order is routed to the second market center.

18. The method of claim 9, in which a total quantity of the trading order is filled at one or more market centers other than the second market center.

19. The apparatus of claim 1,
in which the trading order comprises a price and a quantity, and
in which the instructions, when executed, further direct the at least one processor to seek to fulfill as much as possible of the quantity at the first market center before seeking to fulfill any portion of the quantity at the second market center based on (1) the determination that the first market center provided to the trading platform reserved quantities for each of the first plurality of orders, (2) the determination that the second market center did not provide to the trading platform reserved quantities for each of the second plurality of orders.

20. A apparatus for routing trading orders, comprising:
at least one processor of a trading platform; and
a memory, coupled to the at least one processor, the stores instructions which, when executed by the at least one processor, direct the at least one processor to perform a method comprising:
  receiving from a first market center first trading information about a first plurality of orders, the first trading information comprising a respective disclosed quantity and a respective reserved quantity for each of the first plurality of orders;
  receiving from a second market center second trading information about a second plurality of orders, the second trading information comprising a respective disclosed quantity for each of the second plurality of orders, each of the second plurality of orders comprising a respective reserved quantity, in which the trading platform does not receive the reserved quantities for any of the second plurality of orders;
  receiving a first trading order;
  determining that the first market center provided to the trading platform the respective reserved quantities for each of the first plurality of orders;
  determining that the second market center did not provide to the trading platform reserved quantities for any of the second plurality of orders;
  determining that at least a second trading order at the second market center is contra to the first trading order and is available to be matched with the first trading order;
  determining that at least a third trading order at the first market center is contra to the first stranding order and is available to be matched with the first trading order;
  based on (1) the determination that the first market center provided to the trading platform the respective reserved quantities for each of the first plurality of orders, (2) the determination that the second market center did not provide to the trading platform reserved quantities for any of the second plurality of orders, and (3) the determination that the third order at the first market center is contra to the received trading order and is available to be at least partially matched with the trading order, exhibiting a preference for the first market center over the second market center by routing the first trading order to the first market center, in which the first trading order is at least partially matched with the at least third trading order at the first market center, in which the act of routing at least a porting of the trading order to the first market center comprises:
    determining a quantity of the trading order that can be fulfilled at the first market center; and
    routing the determined quantity of the trading order to the first market center for fulfillment of the determined quantity;
  determining that a remaining quantity of the trading order can be fulfilled at the second market center; and
  routing the remaining quantity to the second market center.

* * * * *